United States Patent
Nickel et al.

(10) Patent No.: US 8,187,685 B2
(45) Date of Patent: May 29, 2012

(54) WINDOW ENVELOPES WITH SCRATCH RESISTANT WINDOW FILM PATCHES

(75) Inventors: Nichole E. Nickel, Midland, MI (US); Eric K. Lee, Midland, MI (US); Stephen J. Skapik, III, Columbus, OH (US); Donald J. Gromacki, Midland, MI (US); Robert A. Gunther, Auburn, MI (US); James P. Maher, Freeland, MI (US)

(73) Assignee: Dow Chemical Technologies LLC, Midland, MI (US)

( * ) Notice: Subject to any disclaimer, the term of this patent is extended or adjusted under 35 U.S.C. 154(b) by 506 days.

(21) Appl. No.: 12/376,520

(22) PCT Filed: Jul. 23, 2007

(86) PCT No.: PCT/US2007/016562
§ 371 (c)(1),
(2), (4) Date: Feb. 5, 2009

(87) PCT Pub. No.: WO2008/024170
PCT Pub. Date: Feb. 28, 2008

(65) Prior Publication Data
US 2011/0042448 A1   Feb. 24, 2011

Related U.S. Application Data

(60) Provisional application No. 60/839,993, filed on Aug. 24, 2006.

(51) Int. Cl.
| B32B 1/08 | (2006.01) |
| B32B 27/10 | (2006.01) |
| B32B 27/32 | (2006.01) |
| C08L 51/04 | (2006.01) |
| C08L 53/02 | (2006.01) |
| B65D 27/04 | (2006.01) |

(52) U.S. Cl. .............. 428/35.7; 428/34.1; 428/34.2; 428/36.92; 428/500; 428/523; 525/71; 525/98; 229/68.1; 229/71

(58) Field of Classification Search .............. 428/34.1, 428/34.2, 35.7, 36.92, 411.1, 500, 507–509, 428/511–513, 515–517, 519, 521, 523; 525/71, 525/98; 229/68.1, 71
See application file for complete search history.

(56) References Cited

U.S. PATENT DOCUMENTS

| 4,188,432 A | * | 2/1980 | Holden et al. ............... 428/35.7 |
| 5,009,953 A | | 4/1991 | Foster et al. |
| 6,451,446 B1 | * | 9/2002 | Regnier ....................... 428/515 |
| 6,897,260 B2 | | 5/2005 | Vynckier |
| 2004/0242786 A1 | | 12/2004 | Vynckier |

FOREIGN PATENT DOCUMENTS

| GB | 862966 | 3/1961 |
| WO | WO-99/43740 | 9/1999 |
| WO | WO-2008/024170 A3 | 2/2008 |

OTHER PUBLICATIONS

Jing-She Song, et al. "Two-Stage Dispersion Polymerization Toward Monodisperse Controlled Micrometer Sized Copolymer Particles" Journal of the American Chemical Society, vol. 126, p. 6562-6563 (2004).

* cited by examiner

Primary Examiner — Walter B Aughenbaugh

(57) ABSTRACT

The invention includes a composition comprising from 40 to 98 weight percent of at least one GPPS, from 0 to 98 weight percent of at least one HIPS, from 0.5 to 10 weight percent at least one styrene block copolymer, from 0.5 to 10 weight percent of at least one polypropylene wherein the combination of GPPS, HIPS, polypropylene and styrene block copolymer make up at least about 90 percent of the composition as well as a film made of the composition, an envelope window patch comprising the film, an envelope comprising the window patch, and a process for making the film.

14 Claims, No Drawings

WINDOW ENVELOPES WITH SCRATCH RESISTANT WINDOW FILM PATCHES

CROSS REFERENCE STATEMENT

This Application claims the benefit of U.S. Provisional Application No. 60/839,993, filed Aug. 24, 2006.

The present invention relates to films of styrene polymers, preferably having improved scratch resistance and to compositions of styrene polymers useful for such films. The invention is also related to the use of such films as window envelope films and envelopes with such a window, as well as a method of making such a film.

BACKGROUND

A window envelope is an envelope with one or more openings of any shape, typically rectangular, that allows examination of information, usually a barcode, name and address, printed on a limited area of matter disposed within the envelope. The opening or openings may be sealed or closed with a window patch composed of a film that allows the printed information to be viewed by individuals as well as by optical character readers such as USPS automatic mail sorting systems.

Patching (during envelope manufacturing) is the process in which window envelope film is cut into patches of a desired length and width, gummed around the edges, and applied to the window envelope. Alternatively, the edges of the window opening or openings may be gummed instead of the edges of the window patch.

The patching process requires the use of a vacuum drum to ensure proper positioning of the film. As the film passes over the surface of the vacuum drum there exists a disparity in the speed of the passing film and the angular velocity of the drum. This disparity of speed results in the abrasion and scratching of the film. Scratching of the film may also occur before and after the patching process for example in film roll handling, loading, and unwinding prior to the patching process and envelope handling post the patching process. The scratches can range in severity and are visible to the human eye and thus can make the window envelope patches less aesthetically pleasing. It is an object of the present invention to produce an improved scratch resistant polystyrene-based film that can be used as a window envelope film to produce a window envelope patch having few or less visible scratches.

According to the present invention, there is now provided a film that is more scratch resistant when used as window envelope film than window envelope film currently used. Advantageously, films of the present invention, when subjected to scratch testing, exhibit scratch resistance in two ways. First, upon visual inspection, film of the present invention has significantly fewer visible scratches than the "control" film. Second, when the film of the present invention is subjected to scratch testing, its haze value does not increase near as much as the "control" film that is subjected to the same scratch testing.

Current window envelopes include window patches fabricated from commercial biaxially oriented films that typically comprise general purpose polystyrene (GPPS)/high impact polystyrene (HIPS) resin blends with HIPS resin usually constituting less than (<) 2.5 weight percent rubber based on weight of polymers in the blend used to make the window patch. This usually corresponds to less than about 40 weight percent (wt %) HIPS in the blend, based upon blend weight.

U.S. Pat. No. 5,009,953 to Foster et al. discloses a window envelope having a non-opaque plastic window patch formed of a film comprising polystyrene and from about 0.1 to about 3.0 wt % of one or more particulate anti-flecking agents having a number average particle size of from about 0.1 micrometer ($\mu m$) to about 10.0 $\mu m$.

Published patent application, WO 99/43740, to Liang discloses a window envelope film having improved scratch resistance by utilizing a nylon copolymer, a styrenic block copolymer, and optionally inorganic particulates. The nylon would preferably have a melt temperature less than 150° C.

SUMMARY OF THE INVENTION

The invention includes a composition comprising from at least 40 to 98 weight percent of at least one GPPS, optionally from 0 to 98 weight percent of at least one HIPS, from at least 0.5 to 10 weight percent at least one styrene block copolymer, from at least 0.5 to 10 weight percent of at least one polypropylene wherein the combination of GPPS, HIPS, polypropylene and styrene block copolymer make up at least about 90 percent of the composition. The composition preferably further contains from 0 to 10 weight percent additives, more preferably including polytetrafluoroethylene in an amount of from about 0.05 to about 0.4 weight percent of the composition.

The invention further includes a film prepared from the composition, a window envelope patch made from the composition or film, and an envelope having such a window patch. Preferably the film is at least one of non-opaque polymeric or plastic film, sufficiently transparent to be optical-scanner readable therethrough, or oriented, preferably biaxially or a combination thereof.

The invention further includes a process for making a film comprising (a) supplying a composition of the invention and (b) extruding the composition.

DETAILED DESCRIPTION OF THE INVENTION

Definitions

The term "45° gloss" is used herein to refer to film gloss as viewed from an angle of 45° and is measured. It is measured according to the procedures of ASTM D2457.

The term "1% Secant modulus" is used herein to refer to the rigidity of the film. It is measured according to the procedures of ASTM 882.

The term "rubbery" is used herein to refer to a component containing rubber such as polyisoprene, polybutadiene, ethylene/butene rubber and the like.

The term "optically transparent" or "transparent" or "optically clear" is used to describe an object that is capable of being seen through based upon unaided, visual inspection. This observation preferably corresponds to a minimum transmission of visible light, that is, a visible light transmission at least about 70%, preferably at least about 75%, and more preferably at least about 80%, most preferably at least about 90%.

The term "clarity" as used herein refers to transmission of visible light. Clarity is considered acceptable when light transmission is higher than about 60 percent, preferably higher than 70 percent, more preferably higher than 75 percent, and most preferably higher than 80 percent. Light transmission is a measurement of the light transmitted through an object, in the practice of this invention through a film or laminate, for instance. It is measured according to the procedures of ASTM D1003 procedure A.

The term "haze" as used herein refers to the intensity of the transmitted light that is scattered more than 2.5° (expressed as a percentage of the total transmitted light) as measured by ASTM D1003 procedure A. The haze value of a film used for an envelope window is advantageously at most about 80%, more advantageously at most about 70%, most advantageously at most about 50%, preferably at most about 40%, more preferably at most about 30% and most preferably at most about 25% percent. All of these values are for the thickness used in the application, preferably at a thickness of about 25 μm-50 μm.

As used herein, the term "particle size" describes the largest dimension or length of the filler particle. As used herein with respect to rubber particle size, the terms "average particle size" and "particle size" are intended to be interchangeable.

"Film" refers to a sheet or the like or combinations thereof, having length and breadth dimensions and having two major surfaces with a thickness therebetween. A film can be a monolayer film (having only one layer) or a multilayer film (having two or more layers). A multilayer film is composed of more than one layer preferably composed of at least two different compositions, advantageously extending substantially the length and breadth dimensions of the film. Layers of a multilayer film are usually bonded together by one or more of the following methods: coextrusion, extrusion coating, vapor deposition coating, solvent coating, emulsion coating, or suspension coating. A film, in most instances, has a thickness of up to about 20 mils ($5 \times 10^{-4}$ m).

"Mer unit" means that portion of a polymer derived from a single reactant molecule; for example, a mer unit from ethylene has the general formula —CH2CH2-.

All percentages, preferred amounts or measurements, ranges and endpoints thereof herein are inclusive, that is, "less than about 10" includes about 10. "At least" is, thus, equivalent to "greater than or equal to," and "at most' is, thus, equivalent "to less than or equal to." Numbers herein have no more precision than stated. Thus, "105" includes at least from 104.5 to 105.49. Furthermore, all lists are inclusive of combinations of any two or more members of the list. All ranges from a parameters described as "at least," "greater than," "greater than or equal to" or similarly, to a parameter described as "at most," "up to," "less than," "less than or equal to" or similarly are preferred ranges regardless of the relative degree of preference indicated for each parameter. For instance, a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

The invention includes a polymer composition comprising at least one general purpose polystyrene, optionally at least one high impact polystyrene, at least one styrene block copolymer and at least one polypropylene. These components make up at least about 90, more preferably at least about 95 weight percent of the film compositions of the invention which optionally, but not necessarily also comprise additives within the skill in the art, preferably including an antiflecking additive. Films are made of the film compositions; therefore, consist essentially of a polymer composition along with a most 10 weight percent, preferably at most 5 weight percent additives.

The polymer composition of the present film contains a crystal polystyrene, also called a general purpose polystyrene (GPPS). GPPS for use in the present invention desirably has a Mw of more than 200,000 g/mol, preferably 280,000 g/mol or more and 350,000 g/mol or less, preferably 320,000 g/mol or less. Measure Mw using gel permeation chromatography and a known standard. The GPPS desirably has a melt flow rate (MFR) of one or more, preferably 1.2 grams per 10 minutes (g/10 min) or more and desirably 3 g/10 min or less, preferably 2 g/10 min or less. Measure MFR according to ASTM method D1238. The GPPS may be free of or may contain plasticizing agents such as mineral oil, ethylene or propylene glycol, phthalates, or styrenic oligomers. Plasticizing agents, when present, are typically present at a concentration of 4 wt % or less, preferably 3 wt % or less, based on GPPS weight. When present, the plasticizing agent typically comprises one wt % or more of the GPPS weight. Examples of suitable GPPS include STYRON® 665 general purpose polystyrene (STYRON is a trademark of The Dow Chemical Company), STYRON 663, STYRON 685D, STYRON 660, and STYRON 6856E.

Compositions and films of the present invention contain preferably at least about 40, more preferably at least about 50, most preferably at least about 65, and at most preferably at most about 98, more preferably at most about 85, most preferably at most about 75 weight percent based on total amount of polymer present of the GPPS component.

The composition also optionally includes at least one high impact polystyrene (HIPS). The term "high impact polystyrene" (also HIPS) broadly comprises a major proportion of a styrene polymer, and as toughening agent an elastomeric polymer wherein the elastomeric polymer is present as discrete particles dispersed in a matrix of a styrenic polymer, preferably graft copolymers or homopolymers of styrenic compounds. These are a family of polystyrene resins which are modified during manufacture to reduce the brittleness by incorporating a rubber during or after styrene polymerization. For example, high impact polystyrene may be copolymerized with other styrene monomers, such as styrene and lower alkyl substituted styrene (e.g. p-methylstyrene). Thus, the high impact polystyrene may be a homopolymer, copolymer or block polymer, and is formed from such vinyl aromatic monomers as styrene, ring-substituted methyl- or polymethyl-styrenes, ring-substituted ethyl- or polyethylstyrenes, ring-substituted propyl- or polypropylstyrenes, ring-substituted butyl- or polybutylstyrenes, ring-substituted mixed polyalkylstyrenes wherein the alkyl groups differ from each other, ring-substituted chloro- or polychlorostyrenes, ring-substituted alkyl- or polyalkylchloro- or polychlorostyrenes in which the alkyl group(s) contain(s) from one to four carbon atoms, alpha-methylstyrene, ring-substituted methyl- or polymethyl-alpha-methylstyrenes, ring-substituted ethyl- or polyethyl-alpha-methylstyrenes, propyl- or polypropyl-alpha-methylstyrenes, butyl- or polybutyl-alpha-methylstyrenes, ring-substituted mixed polyalkyl-alpha-methylstyrenes wherein the alkyl groups differ from each other, ring-substituted chloro- or polychloro-alpha-methylstyrenes, ring-substituted alkyl- or polyalkyl chloro- or polychloro-alpha-methylstyrenes in which the alkyl group(s) contain(s) from one to four carbon atoms, and similar polymerizable styrenic monomers—i.e., styrenic compounds capable of being polymerized by means of peroxide or like catalysts into thermoplastic resins. Homopolymers and copolymers of simple styrenic monomers (e.g., styrene, p-methyl-styrene, 2,4-dimethylstyrene, alpha-methylstyrene, p-chloro-styrene, etc.) are preferred from the standpoints of cost and availability, with polystyrene more preferred. These styrene polymers are modified with about 5 to 25% by weight of a rubber. Examples of the rubber include polybutadiene, styrene-butadiene random and block copolymers, ethylene-propylene diene terpolymers, low-cis type polybutadiene, a high-cis type polybutadiene and styrene-butadiene copolymers or combinations thereof.

Examples of suitable HIPS include high impact polystyrene, commercially available from The Dow Chemical Company under the trade designations STYRON™ 404 and 498, HIPS commercially available from Ineos Styrenics under the trade designation Ineos 486N, and the like.

Compositions and films of the present invention contain 0, but advantageously at least about 0.1, preferably at least about 1, more preferably at least about 10, most preferably at least about 20, and at most preferably at most about 98, more preferably at most about 50, most preferably at most about 30 weight percent based on total amount of polymer present of the HIPS component.

The third component of the formulation is at least one styrene block copolymer. The term "styrene block copolymer or styrenic block copolymer" means a polymer having at least one block segment of a styrenic monomer in combination with at least one saturated or unsaturated rubber monomer segment, and more preferably not having a block of polymer that is neither rubber or styrenic. Suitable styrene block copolymers having unsaturated rubber monomer units include, but are not limited to, styrene-butadiene (SB), styrene-isoprene (SI), styrene-butadiene-styrene (SBS), styrene-isoprene-styrene (SIS), α-methylstyrene-butadiene-α-methylstyrene, α-methylstyrene-isoprene-α-methylstyrene, and the like. The term "styrene butadiene block copolymer" is used herein inclusive of SB, SBS and higher numbers of blocks of styrene and butadiene. Similarly, the term "styrene isoprene block copolymer" is used inclusive of polymers having at least one block of styrene and one of isoprene. The structure of the styrene block copolymers useful in the present invention can be of the linear or radial type, and of the diblock, triblock or higher block type. In some embodiments the styrenic block copolymers having at least four different blocks or a pair of two repeating blocks, for example, repeating styrene/butadiene or styrene/ethylene propylene blocks, are desirable. Styrene block copolymers are well within the skill in the art and are commercially available from Dexco Polymers under the trademark VECTOR, from KRATON Polymers under the trademark KRATON, from Chevron Phillips Chemical Co. under the trademark SOLPRENE and K-Resin, and from BASF Corp. under the trade designation Styrolux. The styrene block copolymers are optionally used singly or in combinations of two or more.

The styrenic portion of the block copolymer is preferably a polymer or interpolymer of styrene or its analogs or homologs, including α-methylstyrene, and ring-substituted styrenes, particularly ring-methylated styrenes. Preferred styrenics are styrene and α-methylstyrene, with styrene being especially preferred.

The rubber portion of the block copolymer is optionally either unsaturated or saturated. Block copolymers with unsaturated rubber monomer units may comprise homopolymers of butadiene or isoprene and copolymers of one or both of these two dienes with a minor amount of styrenic monomer. When the monomer employed is butadiene, it is preferred that between about 35 and about 55 mole percent of the condensed butadiene units in the butadiene polymer block have a 1,2-configuration. When such a block is hydrogenated, the resulting product is, or resembles, a regular copolymer block of ethylene and 1-butene (EB). If the conjugated diene employed is isoprene, the resulting hydrogenated product is or resembles a regular copolymer block of ethylene and propylene (EP). Preferred block copolymers have unsaturated rubber monomer units, more preferably including at least one segment of a styrenic unit and at least one segment of butadiene or isoprene, with SBS and SIS most preferred. Among these, SIS is preferred because it has been found to be particularly effective to compatibilize polypropylene with other polymers in the composition according to the practice of the invention. Furthermore, it is preferred because of a lower tendency to crosslink forming gels during manufacture as compared to SBS. Styrene butadiene block copolymers are alternatively preferred when a cast tenter line is used in manufacturing a film when its higher clarity and lower haze are advantageous.

Elastomeric styrene block copolymers are preferred in the practice of the present invention to provide toughness and lower stiffness than would be obtained in the absence of the block copolymer. Elastomeric behavior is indicated by a property of tensile percent elongation at break of advantageously at least about 200, preferably at least about 220, more preferably at least about 240, most preferably at least about 260 and preferably at most about 2000, more preferably at most about 1700, most preferably at most about 1500 percent as measured by the procedures of ASTM D-412 and/or D-882. Industrially, most polymers of this type contain 10-80 wt % styrene. Within a specific type and morphology of polymer, as the styrene content increases the elastomeric nature of the block copolymer decreases.

The block copolymers desirably have a melt flow rate (MFR) of at least about 2, preferably at least about 4 grams per 10 minutes (g/10 min) and desirably at most 20 g/10 min, preferably at most 30 g/10 min. Measure MFR according to ASTM method D1238 Condition G.

Preferred styrenic block copolymers include styrene-isoprene-styrene block copolymers ("SIS"), styrene-butadiene-styrene block copolymers ("SBS"), styrene-ethylenepropylene block copolymers ("SEP"), and hydrogenated styrenic block copolymer such as styrene-(ethylene butylene)-styrene block copolymers ("SEBS") (e.g., the SEBS commercially available from Kraton Polymers LLC under the trade designation Kraton™ 01657). Preferably, films of the present invention utilize SIS. Preferred styrene block copolymers are highly transparent (have high, that is preferred ranges of clarity), preferably having clarity when measured by ASTM D1746 or ASTM D1003 corresponding to at least about 85%, preferably at least about 90% transmission of visible light. This transparency is believed to be due to the very small domain size, which is typically of the order of 20 nm. In block copolymers the domain sizes are determined primarily by block molecular weights.

The styrene block copolymers also are preferably sufficiently impact resistant to add durability in film applications as compared to the durability of films having the same composition (proportion of components) except without the styrene block copolymers. Notched Izod Impact resistance is measured according to the procedures of ASTM D-256 and preferably gives a no break condition when tested at 72° F. or 23° C.

In one embodiment, a preferred styrene butadiene block copolymer has a radial or star block configuration with polybutadiene at the core and polystyrene at the tips of the arms. Such polymers are referred to herein as star styrene butadiene block copolymers and are within the skill in the art and commercially available from Chevron Phillips Chemical Co. under the trade designation K-Resin. These polymers contain about 27% butadiene or more in a star-block form and often feature a bimodal molecular weight distribution of polystyrene. The inner polybutadiene segments are of about the same molecular weight while the outer polystyrene segments are of different molecular weight. This features facilitates control of polybutadiene segment thickness, to obtain improved clarity. For high clarity, the polybutadiene segment thickness is preferably about one-tenth of the wavelength of visible spectrum or less.

The styrene block copolymer component is useful for compatibilizing the polypropylene component with the styrene-containing component or components. However, incorporation of high amounts of a styrene-isoprene-styrene component can tend to obscure the clarity and transparency of the films.

Films of the present invention have a sufficient amount of styrenic block copolymer present to accomplish a reduction of visible scratches as measured via a difference in haze between the scratched and unscratched area by adding a rubbery component to the otherwise more brittle polystyrene surface to help diminish the tendency for scratches to propagate in either the same direction or propagate away from the initial scratch in a direction approximately perpendicular to the initial scratch. If too much styrenic block copolymer is present then the film becomes rubbery and difficult to cut. Generally, films of the present invention comprise at least about 0.5 percent styrenic block copolymer, preferably at least about 2 percent styrenic block copolymer, and more preferably at least about 3.5 percent styrenic block copolymer by weight based on total weight of the film composition or film. Generally, films of the present invention comprise at most about 10 percent styrenic block copolymer, preferably at most about 5 percent styrenic block copolymer, and more preferably at most about 4.5 percent styrenic block copolymer.

The fourth component of the polymer composition of the invention is at least one propylene polymer or polypropylene. "Polypropylene" or "propylene polymer" means a polymer having at least half of its mer units derived from propylene. These include homopolymers of propylene as well as copolymers of propylene with one or more monomers copolymerizable therewith such as ethylene, butylene, pentene, hexene, heptene, octene, optionally including derivatives of such monomers and combinations thereof.

The term "random copolymer" means a polymer having a random distribution of comonomer in a majority polymer, especially comonomer in propylene polymer, as contrasted with arrangements like block copolymers and impact copolymers. It is understood that complete statistical randomness may not occur and that there may be variation from one polymer molecule to the next within a polymer composition or polymer product.

The term "impact polypropylene" is used herein to refer to heterophasic polypropylene polymers containing up to about 40 percent ethylene-propylene rubber (EPR) intimately dispersed in a polypropylene matrix, especially a crystalline homopolymer polypropylene matrix. A crystalline polypropylene polymer is a polymer with at least about 90 mole percent of its repeating units derived from propylene, preferably at least about 97 percent, more preferably at least about 99 percent. The term "crystalline" is used herein to mean isotactic polypropylene having at least about 93 percent isotactic triads as measured by $^{13}C$ NMR, preferably at least about 95 percent, more preferably at least about 96 percent.

Within the polypropylenes, homopolymer polypropylene, random copolymer polypropylene, and impact copolymer polypropylene are preferred, with homopolymer polypropylene more preferred. Homopolypropylene is preferred to achieve a desired stiffness. Random copolymer polypropylene is preferred when there is a need for improved clarity, and impact copolymer polypropylene is optionally used in applications where greater impact resistance is desired.

The polypropylene preferably has a melt index of preferably at least about 0.1, more preferably at least about 2, most preferably at least about 10, and preferably at most about 100, more preferably at most about 50, most preferably at most about 20 g/10 min measured according to the procedures of ASTM D1238, condition 230° C., 2.16 kg.

Examples of suitable polypropylenes include homopolypropylene commercially available from The Dow Chemical Company under the trade designations H314-02Z, H700-12 and 5D49 polypropylene.

Films of the present invention contain sufficient polypropylene present to accomplish at least one, preferably 2, more preferably 3 of the following: affect the scratch-related surface failure of the film when scratched, add a rubbery component to the otherwise more brittle polystyrene surface, diminish the tendency for scratches to propagate in either the same direction or propagate away from the initial scratch in a direction approximately perpendicular to the initial scratch. Excess polypropylene may result in incompatibility or separation from the film. The styrenic block copolymer also acts as a compatibilizer between the polypropylene and polystyrene. Generally, films of the present invention comprise at least about 0.5 percent polypropylene, preferably at least about 1 percent polypropylene, and more preferably at least about 1.5 percent polypropylene. Generally, films of the present invention comprise at most about 10 percent polypropylene, preferably at most about 5 percent polypropylene, and more preferably at most about 3.5 weight percent polypropylene.

The polypropylene advantageously affects the scratch-related surface failure of the polystyrene film when being scratched and is believed to have higher abrasion or scratch resistance than polystyrene in the film. The addition of polypropylene adds scratch resistant additive component to the polystyrene surface. The styrene block copolymer mentioned previously also act as a compatibilizer that helps to disperse and anchor the polypropylene phase in the polystyrene film matrix.

The polypropylene and styrene block copolymer are preferably blended together before they are admixed with the GPPS and HIPS, if present, because doing so allows the styrene block copolymer need to compatibilize the polypropylene for dispersion in the polystyrene matrix. In one embodiment a salt and pepper blend of the polypropylene and styrene block copolymer is formed. The term "salt and pepper blend" is used to describe a blend which a mixture of comminuted solid particles (for instance, pellets) of each polymer without melting. The salt and pepper blend is then preferably melt mixed by means within the skill in the art such as by compounding extruder, preferably a twin screw extruder. Extrudate is formed into comminuted particles, preferably pellets, for instance by cooling in a water bath. This blend of polypropylene and styrene block copolymer is referred to hereinafter as the preblend.

The preblend comprises polypropylene and styrene block copolymer and optionally additives within the skill in the art such as talc as well as optionally at least a portion of the GPPS of the composition, added with the other polymers or after they are at least partially blended, if desired, for instance, to achieve desired handling characteristics. The polypropylene and the styrene block copolymer are combined in a ratio of preferably at least about 1:99, more preferably at least about 10:90, most preferably at least about 25:75 and preferably at most about 99:1, more preferably at most about 75:25, most preferably at most about 50:50 based on weight of polypropylene to styrene block copolymer.

The preblend is suitably admixed with the GPPS and HIPS, if present, by any means within the skill in the art. Optionally the GPPS and HIPS, if present, are admixed together before blending with the preblend. Suitable mixing means include any means within the skill in the art for mixing polymers and include metered feeding into an extruder.

Compositions according to the practice of the invention and films made therefrom and preferably used for window patches in window envelopes of the present invention optionally contain one or more conventional additives such as antioxidants, inorganic particulates, abrasion resistance additives, polytetrafluoroethylene fibers or flakes and processing aids. Primary antioxidants include phenolic antioxidants such as IRGANOX™ 1010 and IRGANOX™ 1076, both commercially available from Ciba Specialty Chemicals, and CYANOX™ 1790, commercially available from Cytec Industries Inc. Secondary antioxidants include hydrolytically stable phosphite antioxidants such as IRGANOX™ 168, commercially available from Ciba Specialty Chemicals. Inorganic particulates, which may have a beneficial effect upon film scratch resistance, include talc, calcium carbonate and silicon dioxide. Abrasion resistance additives include particulate polyamides. Core-shell polymer particles and crosslinked polymer particles or microspheres, such as styrene-butadiene core-shell rubber and styrene-divinylbenzene crosslinked polymer spheres, with a refractive index of from 1.55 to 1.65 may also be used if desired as taught by Mitchell A. Winnick in "Two-Stage Dispersion Polymerization Toward Monodisperse Controlled Micrometer Sized Copolymer Particles", Journal of the American Chemical Society, Volume 126, page 6562 (2004). An antiflecking additive, preferably a polytetrafluoroethylene (PTFE) is particularly preferred. Such additives are commercially available, for instance the concentrate of 20 weight percent PTFE and 80 weight percent GPPS, commercially available from Spartech Corporation under the trade designation CN-201. Desirable amounts vary with equipment used to cut the film, because the purpose is to avoid flecks of polymer that result from cutting. PTFE is preferably present in an amount corresponding to preferably at least about 0.1, more preferably at least about 0.5, most preferably at least about 0.7 and preferably at most about 2, more preferably at least about 1.5, most preferably at least about 1.25 weight percent concentrate in the polymer composition of the invention. This corresponds to PTFE preferably present in an amount corresponding to preferably at least about 0.02, more preferably at least about 0.1, most preferably at least about 0.15 and preferably at most about 0.4, more preferably at least about 0.3, most preferably at least about 0.25 weight percent PTFE in the polymer composition of the invention.

Compositions according to the practice of the invention are preferably formed into films of the invention. The term "film" or "films" as applied to the present invention are monolayer films and unless expressly specification will refer to monolayer films. However, it is within the scope of the present invention to produce a multilayer film comprising at least one scratch-resistant surface layer, wherein the scratch-resistant surface layer has the same composition as monolayer films of the present invention.

Films of the present invention can be made by film producing techniques and processes known in the art, such as cast tentering and blown film processes. Particularly desirable are blown film processes such as those described in U.S. Pat. No. 6,897,260 and Great Britain Patent (GB) 862,966 and US pregrant publication 20040242786 (which illustrate the skill in the art and are incorporated herein by reference to the extent permitted by law).

To avoid unintended crosslinking, processing temperatures and residence times should be minimized. Melt temperatures are preferably below about 230° C., preferably below about 220° C., more preferably below about 210° C. The higher the process melt temperature the shorter the polymer can be kept at that temperature before unacceptable degradation. For instance, exposure to temperatures in excess of about 230° C. is preferably limited to less than about 10 minutes, more preferably less than about 7 minutes, most preferably less than about 300 seconds.

One suitable process ("Process A") for preparing films of the present invention is a blown film process using an apparatus as described in U.S. Pat. No. 6,897,260 or GB 862,966 or implied in US Pregrant Publication 20040242786. Feed polymer pellets to the apparatus and convert them to a polymer melt having a temperature within a range of from 170° C. to 100° C.; then cool the polymer melt to a temperature within a range of from 130° C. to 170° C. to increase melt viscosity before extruding the polymer melt through a blown film die into a gaseous atmosphere. Maintain the gaseous atmosphere at a temperature at least 40° C. below the heat distortion temperature of the each polymer composition component(s) (optional HIPS component, GPPS, styrene block copolymer component, and polypropylene component) in the polymer melt. Blow the extruded polymer melt according to the bubble process of GBP 862,966.

Another possible blown film process ("Process B") suitable for preparing films of the present invention uses two extruders (Extruder 1 and Extruder 2) in series. Extruder 1 is a 2½ inch (6.35 cm) diameter, 24:1 single screw extruder with five barrel zones, each set at a temperature between 155° C. and 200° C., typically increasing in temperature down the extruder. Extruder 2 is a 3½ inch (8.89 cm) diameter, 32:1 single screw with a barrier mixing screw and five barrel zones, each having temperature set point typically at a temperature from 115° C. and 175° C. Feed polymer pellets into Extruder 1 to plasticize the polymer and pump the polymer to Extruder 2 at a temperature of 200-260° C., for instance 235° C. The polymer proceeds from Extruder 1 through a transfer line and into the entry port of Extruder 2. Cool the polymer in Extruder 2 to a melt temperature (extrusion temperature) of selected between 150-190° C., for instance 166° C., by contact with cooled walls of the extruder to achieve a stable bubble and to optimize orientation release stress (ORS) properties of the resulting film to a desirable value. Extrude the polymer from Extruder 2 through a 3.25 inch (8.3 cm) annular die with die gap of 0.12 in (0.3 cm), and then through a 4.5 inch (11.4 cm) diameter air ring and blow or expand the polymer into a bubble with a diameter that typically ranges from 9 inches (22.9 cm) to 24 inches (63.5 cm) using air heated to an environmental set point of 20-80° C. Use the bubble blowing process of GB 862,966. Collapse the blown film or bubble into a double-fold film using a series of flattening rollers and trim the edges from the double-fold film to yield two sheets of film having a width that typically ranges from 36 in. (91.4 cm) to 42 in. (106.7 cm). Wind the sheets of film into rolls for later use.

Control film orientation to a degree by varying the distance between the annular die and a point at which the polymer melt begins to stretch in a direction transverse to the extruder's axis.

In another embodiment, a preferred process for preparing the films is a cast tentering method ("Process C"). First a film or sheet is cast, that is a self-supporting film or sheet is formed from a melt supplied by an extrusion system. The resin is extruded through a slit as a flat sheet, approximately 0.3-2.5 mm thick, onto a cooled, smooth cast roll at a temperature of from about 30 to about 70° C.) to form a monolayer film. The cast roll speed is adjusted to result in the thickness of film to from about 0.3 to about 1 mm thick. This film or sheet carried by rollers into a heated chamber containing a tenter frame. Air in the chamber is heated sufficiently to heat the film or sheet enough to permit stretch without tearing, at a temperature, depending on composition of the film, approximately about 95° C. to about 150° C. A tenter frame has two side-by-side endless chains that diverge at constant angle. The film is held onto the chains by film clips. Divergence of the chains forces the polymer to stretch as it is transported along the chain, and imparts the desired orientation. Stretch rate is determined by the chain speed, divergence angle, and extent of orientation. The extent of orientation is determined by the ratio of the width of the film entering to the width of the film leaving the system to achieve amounts of stretch and corresponding shrink described previously. This imparts primarily TD orientation. The film is then annealed, if desired, and released. In most instances, edges of the film are slit off, ground, and recycled, and the film is optionally wound full width or split into narrower widths, which are optionally treated to improve printability and then wound onto rolls for further processing.

Films used for window patches in window envelopes of the present invention are preferably oriented, at least to a degree and at least in the machine direction, because of the process by which they are prepared. For example, conventional blown film processes and cast tentering processes inherently orient the resulting film. Skilled artisans recognize that one may vary the degree of orientation and, in doing so, may affect other film properties such as percent haze, clarity and 45° gloss.

Skilled artisans recognize that one may, by properly controlling drawing and cooling conditions, impart orientation into a film product during various stages of fabrication. The extent of orientation can, for example, be varied through control of draw ratio along film MD and/or TD, strain rate of drawing, and other processing parameters, especially temperature.

Skilled artisans commonly understand film formation from a melt rheology point of view as extrusion and elongation of a viscoelastic melt under controlled conditions. They consider film formation to be complete when a film-shaped molten polymer, after experiencing a viscoelastic flow history, is cooled to ambient temperature. Flow behavior of the viscoelastic melt throughout the extrusion process typically depends upon a relationship between viscosity, shear rate, and temperature. Oriented polymer films, preferably biaxially oriented polymer films, representative of the present invention may be either monolayer or multilayer films. In a multilayer film, at least one outer layer comprises, optionally at least one rubber-modified vinyl aromatic polymer resin (HIPS), at least one vinyl aromatic polymer resin (GPPS) with polypropylene and at least one styrene block copolymer according to the practice of the invention as previously described.

To be used as a window envelope film, that is window envelope patches, the film of the invention is preferably optically transparent. The film is preferably sufficiently transparent that such information as name and address can be readily examined through the film. Advantageously, before scratching, or unscratched, it has a haze of at most about 85%, preferably at most about 70%, more preferably at most about 50%, most preferably at most about 30%. After the scratching that may occur in the normal course of manufacturing the window envelope patches and subsequently the envelopes as well as in use of the envelopes including exposure to automatic mail handling machines, as simulated by the test described hereinafter, the window envelope film advantageously has a haze of at most about 85%, preferably at most about 70%, more preferably at most about 60%, most preferably at most about 50%.

The window envelope film of the invention advantageously a thickness and a 1% Secant Modulus sufficient to allow patches from the film to be affixed to envelope windows at commercially acceptable production speeds without undesirable buckling or puckering due to residual stress released from envelope paper. The thickness must not, however, be so great that the window envelopes with patches formed from a polymeric film becomes economically unattractive. To this end, the thickness of the envelope window film of the invention preferably at least about 0.8 mil (20.3 µm), more preferably at least about 1 mill (25.4 µm), most preferably at least about 1.05 mil (26.7 µm), preferably at most about 2 mil (51 µm), more preferably at most about 1.5 mil (38.1 µm), most preferably at most about 1.25 mil (31.8 µm) However, films of the present invention useful in other applications may be significantly thicker. For example, films of the present invention useful in certain lamination applications are up to 6 mils (152.4 m) thick. The 1% Secant modulus as measured by the procedures of ASTM 882 is preferably at least about 1,379 MPa, more preferably at least about 1,896 MPa, most preferably at least about 2,413 MPa and at most about 4,482 MPa, more advantageously at most about 3,792 MPa, preferably at most about 3,447 MPa, more preferably at most about 3,103 MPa, most preferably at most about 2,965 MPa.

The following examples illustrate, but do not limit the present invention. All parts and percentages are based upon weight, unless otherwise specified. Arabic numerals represent examples (Ex) of the present invention while letters of the alphabet designate comparative examples (Comp Ex).

Physical property testing of films for use in forming window patches suitable for use in window envelopes uses the following procedures:

Percent Haze—ASTM D-1003

Scratch Test Procedure: The scratch resistance of an envelope window film is tested using a high speed scratching device, which is a computer operated desktop computer numerical control (CNC) lathe commercially available from Microkinetics Corporation under the trade designation Model # DT 951070 or Desktop CNC Lathe Package, model number 999-6300-002, modified as described hereinafter, with a vertical sample mount including a mounting plate. The mounting plate holds a film sample, 4 inches (10.16 cm) in diameter, using a flat ring having 8 screws around the perimeter (to maintain sample flatness). Prior to mounting the sample, the sample is labeled with the machine direction (MD), transverse direction (TD), inside wind of the roll (IN), and outside wind of the roll (OUT). The platform on the desktop CNC lathe is set to the zero position, and the surface position on the lathe is located in order to achieve a depth of scratch which affects haze but does not tear the film. During the testing operation, a spring arm is mounted with a stiff, carbide tip pin. The sample mount rotates at 1200 rotations per minute (RPM) (800 ft/min (4.06 m/second)). The arm that, in woodwork, would hold the cutting blade holds the carbide pin and is moved in a radial direction to give an annular band of scratch marks ⅝ inch (1.59 cm) wide with an outer diameter close to 3 inches (7.62 cm) at the surface of the film sample. Therefore, the scratching tool moves on the surface of the film at the speed starting from 864 ft/min (4.39 m/s) at the outer edge to 47.1 ft/min (2.39 m/s) at the inner edge, spanning the speeds typically encountered in envelope processing equipment. The sample is then removed from the mounting plate and has 5 haze measurements read. Two haze measurements are in the machine direction (MD), two measurements in the transverse direction (TD), and one in the center where no scratching has occurred. After the haze measurements are taken, each scratched area evaluated for haze is subtracted from the center (non-scratched) area. The change or difference in haze is calculated for all four areas and an average and standard deviation is found. Two film samples are tested for each film type in order to evaluate the inside wind (IN) and outside wind (OUT) of the film. The less visible the scratches, the lower the change in haze results. The scratching device and its use are further described in U.S. Provisional Patent Application filed the same day as this application with inventors Lakrout, Hamed; Meyers, Greg; Chartier, Mark; and Nickel, Nichole which is incorporated herein by reference in its entirety.

Example 1 and Comparative Sample A

Materials Used

SIS-1 is a styrene isoprene styrene block copolymer having properties of 30% styrene and 70% isoprene and 30 g/10 min melt flow rate (MFR) (at 200° C., 5 kg) commercially available from Dexco Polymers under the trade designation Vector 4211A;

PP-1 is a homopolymer polypropylene having properties of 2 g/10 min MFR (at 230° C., 2.16 kg), commercially available from The Dow Chemical Company under the trade designation Dow H314-02Z;

GPPS-1 is a general purpose polystyrene having a molecular weight of 305,000 and a MFR of 1.5 g/10 min (at 200° C., 5.0 kg), commercially available from The Dow Chemical Company under the trade designation Styron 665;

HIPS-1 is a high impact polystyrene having 7.2 wt % rubber, based upon resin weight, and an average rubber particle size of 2.0 µm having properties of 1.6 ft-lb/inch (0.2802 N/mm) Compression Notched Izod and 2.3 g/10 min MFR (at 200° C., 5.0 kg), commercially available from The Dow Chemical Company under the trade designation STYRON 404

ADD-1 is an antiflecking additive, a polytetrafluoroethylene (PTFE) concentrate (20 wt % PTFE and 80 wt % GPPS, based upon concentrate weight), commercially available from Spartech Corporation under the trade designation CN-201.

Compounding Process of SIS-PP Modifier

A compound, hereinafter referred to as Compound A is made of 18.75 kg SIS-1 and 6.25 kg PP-1. Compound A ingredients are 75% SIS and 25% PP and are first made into a salt and pepper blend by mixing of pellets. That blend is then loaded into the hopper of a 30 mm diameter, co-rotating twin screw compounding extruder at a temperature of 205° C. rotating at a rate of 30 rpm (rotations per minute), and extruded into strands at an output rate of 13.6 kg/hr. The strands are then passed through a cooling water bath at a temperature of 25° C. and cut into pellets by rotating knives in a pellitizer.

Twenty-five kilograms of Compound A is dry-blended in a high intensity blender commercially available from Henschel under the trade designation THYSSEN HENSCHEL KASSEL Type XU85 Blender with 25 kg of GPPS-1. This is to prevent Compound A from sticking to itself during further handling. This compound will be referred to as Compound B.

Compound B, HIPS-1, GPPS-1, and ADD-1 are metered separately into the feed hopper of the extruder at the ratio of 12% Compound B, 25% HIPS-1, 62% GPPS-1, and 1% ADD-1. The weigh feeder weighs out the appropriate percent by weight of each of the individual components prior to blending. Once blended the materials are dropped in the extruder hopper via gravity.

Film Preparation Process (Hereinafter Referred to as Process-A')

Prepare an oriented blown polymer film using a apparatus with two extruders (designated "Extruder 1" and "Extruder 2") arranged in series. Extruder 1 is a 2½" diameter, 24:1 single screw extruder with 5 barrel zones having temperatures set points from 155° C. to 200° C. (155° C. Zone 1, 165° C. Zone 2, 200° C. Zones 3 through 5). Extruder 2 is a 3½" diameter, 32:1 single screw with a barrier mixing screw. Zone set point temperatures for this extruder's 6 barrel zones range from 115° C. to 175° C. (175° C. Zones 1 through 4, 130° C. Zone 5, and 115° C. Zone 6). Feed polymer pellets to Extruder 1 where the material is plasticized and pumped to a feed port of Extruder 2 at a melt temperature of 235° C. Cool polymer melt passing through the second extruder to a melt temperature of 188° C. by contact with temperature controlled extruder barrel walls. The polymer melt exits Extruder 2 via a 3 inch (in.) (7.6 centimeter (cm)) annular die and then through a 4.5 in. (11.4 cm) diameter air ring where it is blown or expanded into a bubble using.

Collapse the downward blown film or bubble into a double-fold film using a series of flattening rollers (called a collapsing rack) followed by primary nip rolls, and trim the edges from the double-fold film to yield two sheets of film having a width that typically ranges from 36 in. (91.4 cm) to 42 in. (106.7 cm). Then the film is put through the secondary nip rolls before the two sheets of film are separated. Just prior to film being collected on cores the film passes through a dancer which controls line tension to maintain high roll quality, for instance by eliminating wrinkles, and the like. The film is then wound onto a core to make film rolls for later use and evaluation. The collapsing and winding of the polymer web is done with a rotating frame and winder.

The resulting film has a target thickness of approximately 1.1 mils (28 μm). A skilled artisan recognizes that, in practice, some variability from the target thickness is normal.

Comparative Sample A

An admixture of 74 wt GPPS-1, 25% HIPS-1, and 1 wt % ADD-1 all based upon organic polymer content of the composition is formed according to the procedure previously described. A film is formed according to Process A'.

Evaluate the film for percent haze. Scratch the film using the Scratch Test Procedure Then evaluate the scratched film for percent haze. Record results in Table 1.

Example 1

Prepare a composition as previously described using 62 wt % GPPS-1, 25W HIPS-1, 12% of Compound B, and 1 wt % ADD-1. A film is formed according to Process-A'.

Evaluate the film for percent haze. After scratching the film according to the Scratch Test Procedure then evaluate the scratched film for percent haze. Record results in Table 1.

TABLE 1

Scratch Test Results

| Film Surface Scratched | Haze (%) Value of Scratched Film | Haze (%) Value of Un-scratched Film | Delta Haze (%) from Scratch |
| --- | --- | --- | --- |
| C.S. A* Outside Surface | 50.82 | 18.79 | 32.03 |
| C.S. A* Inside Surface | 50.85 | 15.30 | 35.55 |
| Ex. 1 Outside Surface | 41.95 | 19.29 | 22.66 |
| Ex 1 Inside Surface | 40.45 | 19.70 | 20.75 |

*C.S. Comparative Sample, not an example of the invention.

The data in Table I illustrates that the value of the difference in haze from the scratch test for the film of Example 1 is less than that of the film of Comparative Sample A, which indicates that the film of the invention is more scratch resistant. A film is considered more scratch resistant when the change in film optical haze due to scratching is less than a film with more haze changes caused by scratching under the same conditions. A film after scratching has an increase in haze as compared with the haze of the same film before scratching or the haze of an unscratched portion of the same film, which haze increase is referred to hereinafter and in Table 1 as Delta Haze. A film of the invention is preferably more scratch resistant than a film of the same composition except with no polypropylene or styrene block copolymer (comparison), showing a Delta Haze of the film of the invention of preferably at most about 30, more preferably at most about 20, most preferably at most about 10 measured in percent haze, a difference of Delta Hazes between the Delta Haze of a film of the invention and the Delta Haze of the comparison preferably of at least about 3, more preferably at least about 5, most preferably at least about 10 percent haze, or a combination thereof.

Embodiments of the invention include the following:
1. A composition comprising from at least about any of 40, 50, or 65 to about any of 75, 85 or 98 weight percent of at least one GPPS, from at least about any of 0, 0.1, 1, 10, or 20 to about any of 30, 50 or 98 weight percent of at least one HIPS, from at least about any of 0.5, 1, 2 or 3.5 to about any of 4.5, 5, or 10 weight percent of at least one styrene block copolymer, from at least about any of 0.5, 0.5, 1 or 1.5 to about any of 3.5, 5, or 10 weight percent of at least one polypropylene, each based on the total weight of the composition and wherein the combination of GPPS, HIPS, polypropylene and styrene block copolymer make up at least about 90 or 95 weight percent of the composition.
2. The composition of Embodiment 1 wherein the combination of GPPS, HIPS, polypropylene and styrene block copolymer make up at least about 90 or 95 percent of the composition and the remainder consists of additives within the skill in the art.
3. The composition of Embodiments 1 or 2 wherein an anti-fleck additive is present in an amount of from about any of 0.1, 0.5, or 0.7 to about any of 1.25, 1.5 or 2 weight percent based on weight of the composition, polytetrafluoroethylene is present in an amount of from about any of 0.02, 0.1, or 0.15 to about any of 0.4, 0.3 or 0.25 weight percent based on weight of the composition, or a combination thereof.
4. The composition of any of Embodiments 1 through 3 wherein at least one GPPS has at least one of a molecular weight of at least about 200,000 g/mol, at least about 280,000 g/mol, at most about 350,000 g/mol, at most about 320,000 g/mol measured using gel permeation chromatography and a known standard, a melt flow rate (MFR) of at least about one, at least about 1.2, at most about 3 grams per 10 minutes (g/10 min) measured according to ASTM method D1238 (at 200° C., 5.0 kg); at least one HIPS, if present, has a rubber content between about 5 and about 25 weight percent; at least one styrene block copolymer is a styrene isoprene styrene block copolymer; at least one polypropylene is selected from a homopolypropylene or an impact polypropylene; or any combination thereof.
5. The composition of any of Embodiments 1 through 4 which is a composition used to make a film.
6. A film comprising any of the Embodiments 1 through 5.
7. The film of Embodiment 6 which is optically transparent.
8. The film of any of the Embodiments 6 through 7 which has a haze less than about any of 25, 30, 40, 50, 70, or 80 percent as measured by the procedures of ASTM D1003, procedure A before scratching.
9. The film of any of the Embodiments 6 through 8 which has a haze after scratching less than that of a film of the same constituents except without the styrene block copolymer and the polypropylene, that is a film having the same additives in the same amounts and having the same ratio of GPPS to HIPS as the film of the Embodiment preferably by a difference in Delta Hazes of at least about any of 3, 5 or 10 percent.
10. The film of any of the Embodiments 6 through 9 which has a Delta Haze comparing before and after scratching or scratched and unscratched portions of less than any of 10, 20 or 30 percent; which has a 1% Secant modulus as measured by the procedures of ASTM 882 from at least about any of 1,379 MPa, 1,896 MPa, or 2,413 MPa to at most about any of 4,482 MPa, 3,792 MPa, 3,447 MPa, 3,103 MPa, or 2,965 MPa; or more preferably a combination thereof.
11. An envelope window patch comprising a film of any of Embodiments 6 through 10.
12. An envelope having a window patch of Embodiment 11.
13. A method of making a film of any of Embodiments 6 through 10 comprising at least steps of (a) supplying the composition of any of embodiments 1 through 5; and (b) extruding the composition optionally including any of the steps of (c) blowing the composition into a film, (d) casting the composition into a film; (e) collecting the film or a combination thereof.

The invention claimed is:
1. A film comprising a layer that is a blend composition comprising from 40 to 98 weight percent of at least one

GPPS, from 0 to 98 weight percent of at least one HIPS, from 0.5 to 10 weight percent at least one styrene-isoprene-styrene (SIS) styrene block copolymer, from 0.5 to 10 weight percent of at least one polypropylene wherein the combination of GPPS, HIPS, polypropylene and styrene block copolymer make up at least about 90 weight percent of the composition.

2. The film of claim 1 wherein the styrene block copolymer is from 1 to 5 weight percent of the composition.

3. The film of claim 1 wherein the polypropylene is an impact polypropylene or a homopolymer polypropylene.

4. The film of claim 1 wherein the polypropylene is homopolymer polypropylene.

5. The film of claim 1 wherein the polypropylene is present in an amount of from 1 to 4 weight percent of the composition.

6. An envelope having one or more window openings, at least one window opening being closed or sealed by a polymeric film of comprising a layer that is a blend composition comprising from 40 to 98 weight percent of at least one GPPS, from 0 to 98 weight percent of at least one HIPS, from 0.5 to 10 weight percent of at least one styrene block copolymer, from 0.5 to 10 weight percent of at least one polypropylene wherein the combination of GPPS, HIPS, polypropylene and styrene block copolymer make up at least about 90 weight percent of the composition.

7. The envelope of claim 6 wherein the film forms a polymeric or plastic window patch having a measured haze of less than 80% as measured by ASTM D1003, procedure A, and is biaxially-oriented.

8. The envelope of claim 6 wherein the styrene block copolymer is SIS.

9. The envelope of claim 6 wherein the styrene block copolymer is 1 to 5 weight percent of the composition.

10. The envelope of claim 6 wherein the polypropylene is an impact polypropylene or a homopolymer polypropylene.

11. The envelope of claim 6 wherein the polypropylene is homopolymer polypropylene.

12. The envelope of claim 6 wherein the polypropylene is present in an amount of from 1 to 4 weight percent of the composition.

13. An envelope according to claim 6 wherein the styrene block copolymer is selected from the group consisting of styrene isoprene-styrene (SIS), styrene-butadiene-styrene (SBS), styrene-ethylene-propylene (SEP), or styrene-(ethylene butylene)-styrene (SEBS) block copolymer or a combination thereof.

14. The envelope of claim 13 wherein the film forms a polymeric or plastic window patch having a haze of less than 80% as measured by ASTM D1003, procedure A, and is biaxially-oriented.

* * * * *